Patented Jan. 26, 1937

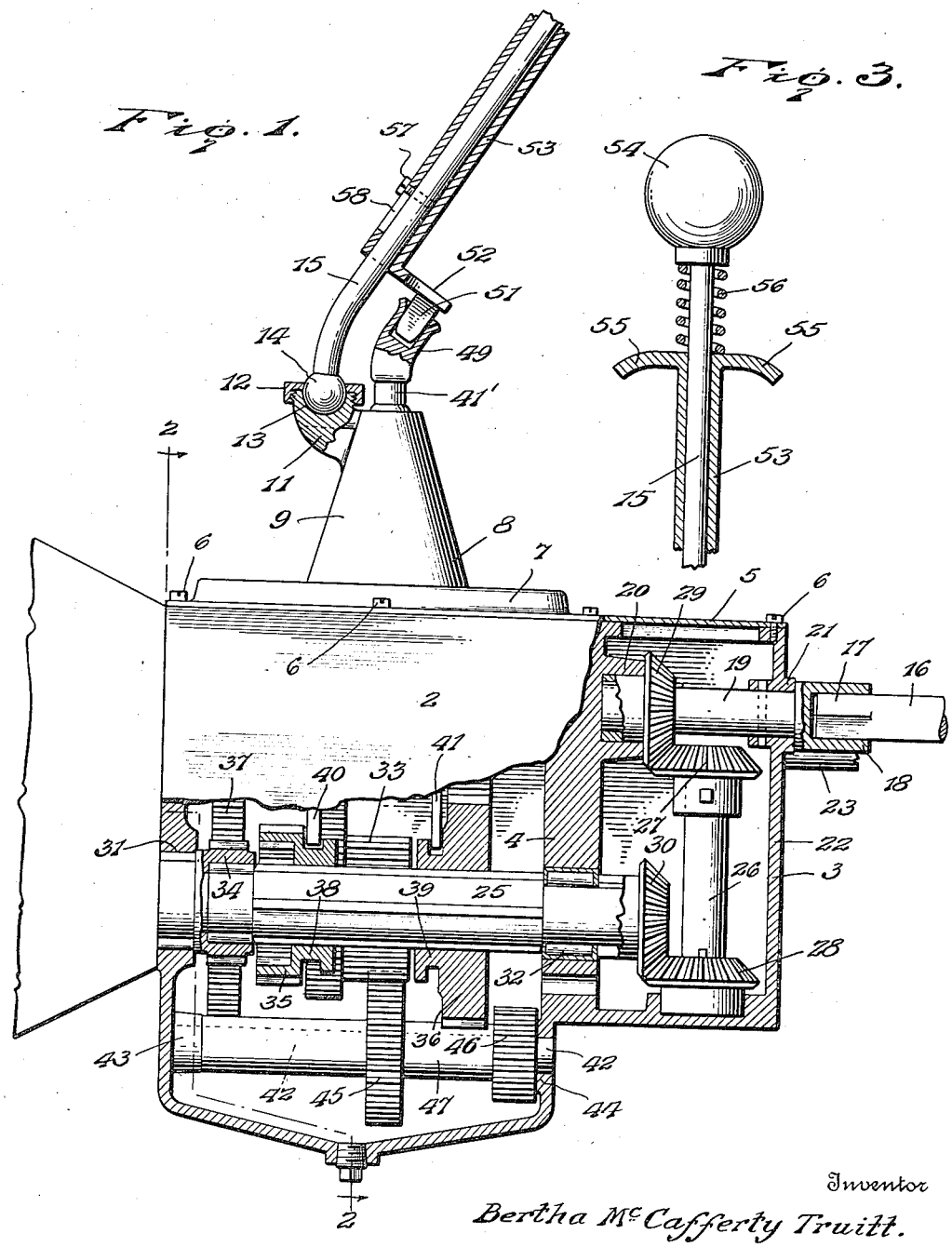

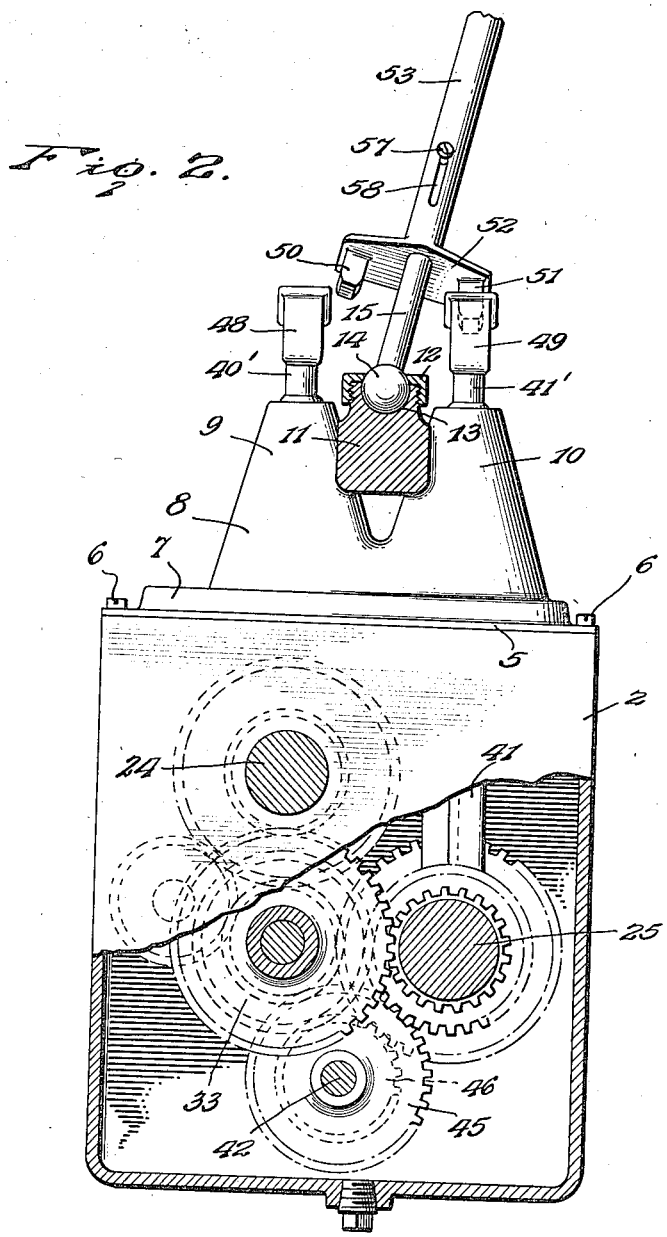

2,069,121

UNITED STATES PATENT OFFICE 2,069,121

GEAR SHIFTING MECHANISM

Bertha McCafferty Truitt, Calumet, Okla.

Original application April 28, 1934, Serial No. 722,945. Divided and this application December 21, 1935, Serial No. 55,622

2 Claims. (Cl. 74—473)

This invention relates to an improved gear shifting mechanism and the present application constitutes a division from my prior application for a patent upon an attachment for an automobile filed April 28, 1934, Serial No. 722,945.

One object of the invention is to provide a gear shift mechanism of such construction that either the main transmission of an automobile or an auxiliary transmission associated with the main transmission may be actuated through the medium of a single lever which is mounted in such a manner that it may be selectively engaged with the selector of either transmission.

Another object of the invention is to provide improved means for mounting the selectors consisting of a twin head rising from the transmission casing, the said twin head also carrying a bearing bracket by means of which the lever is mounted for movement into position for operative engagement with head of a desired selector.

Another object of the invention is the provision of a single lever carrying improved means for engaging the heads of the selectors when the lever is moved into position for cooperative engagement with the selector of a predetermined transmission.

The invention is illustrated in the accompanying drawings, wherein

Figure 1 is a view partially in side elevation and partially in section of the improved gear shifting mechanism.

Figure 2 is a sectional view taken along the line 2—2 of Figure 1.

Figure 3 is a fragmentary view of the upper portion of the lever.

In the accompanying drawings, the numeral 1 indicates the rear portion of a clutch casing at the rear of which is mounted a transmission housing 2 having an extended rear end portion 3. A partition 4 separates the extension 3 from the main chamber of the transmission housing. A cover plate 5 closes the upper end of the housing and is removably secured by bolts 6 in order that access may be had to the interior of the housing when necessary. A portion of the cover plate over the main chamber of the housing is projected upwardly, as shown at 7, and this portion of the cover carries an upwardly extending twin head 8 consisting of conical sections 9 and 10. Lower portions of the two sections are formed integral with each other but their upper portions are disposed in transverse spaced relation and between them they carry a bracket 11 which is preferably formed integral with them. This bracket extends forwardly, as shown in Figure 1 and then curves upwardly and terminates in a reduced upper portion which is threaded to receive a cap 12 and has its upper face formed with a hemispherical socket 13. Therefore, the ball 14 at the lower end of the lever 15 may be secured in the socket 13 and the lever mounted for universal movement.

The shaft 16 by means of which rotary motion is to be transmitted to auxiliary mechanism, such as shown in the application of which this is a division, has a squared end portion 17 engaged in a socket 18 formed at the rear end of a shaft 19 mounted in bearings 20 and 21 carried by the partition 4 and the rear wall 22 of the housing. The shaft 16 is, therefore, disposed in parallel spaced relation to the vehicle propeller shaft 23 which is alined with the engine shaft 24 and rotary motion is transmitted to the shaft 19 from the main auxiliary shaft 25 by a shaft 26, the shaft 26 being mounted vertically in the rear extension 3 of the housing and carrying gears 27 and 28 which mesh respectively with the gears 29 and 30 carried by the shaft 19 and the main auxiliary shaft 25. The shaft 25 which constitutes the main shaft of the auxiliary transmission forming part of my invention is mounted in bearings 31 and 32 and extends longitudinally in the housing 2 at one side of the cluster gear 33 forming a part of the regular vehicle transmission which may be referred to as the main transmission. The shaft 25 is equipped with gears 34, 35, and 36, the gear 34 being loose and meshing with a gear 37 of the main transmission to be rotated whenever the cluster gear shaft 33 is rotated, while gears 35 and 36 are splined to move along the shaft 25 but rotate therewith. Grooved hubs 38 and 39 project from the gears 35 and 36 for engagement by shifting yokes or selectors 40 and 41 which are of a conventional construction. Below the shaft 25 is a countershaft 42 mounted in bearings 43 and 44 and carrying gears 45 and 46 united by a sleeve 47 which serves as a common hub for the two gears. The gear 45 meshes with the cluster gear 33. By meshing the gear 36 with the smaller member of the cluster gear, the shaft 25 will be driven at low speed while meshing the gear 36 with the gear 46 will reverse the direction in which the shaft 25 rotates. If the gear 35 is put in mesh with the larger member of the cluster gear, the shaft 25 will be driven at second speed while if the gear 35 is engaged directly with the gear 34, the shaft 25 will be driven in high. It will be understood that the gear 35 has both external and internal teeth so that it may be engaged with either the gear 33 or the gear 34. The gears 35 and 36 are shifted by means of the selectors 40 and 41 and upon referring to Figure 2 it will be seen that these selectors have heads 40' and 41' extending upwardly through the sections 9 and 10 of the twin head 8 and at their upper ends terminating in sockets 48 and 49 which curve rearwardly, as shown in Figure 1, and are open at their upper ends to receive companion lugs 50 and 51 carried by a cross head or plate 52 formed at and projecting rearwardly from the lower end of the sleeve 53 carried by the lever 15. As the lever is mounted in the socket 13 for universal movement, it may be set at will to engage the lug 50 in the socket 48 or the lug 51 in the socket 49, and, therefore, the lever may be set to shift the gears of the automobile transmission referred to as the main transmission or to shift the gears of the auxiliary transmission. The heads 40 and 41' of the selectors extending through the sections of the twin head are mounted in the usual manner so that they may have universal movement and work through slots of well-known H-form to permit the selectors connected therewith to be shifted to engage the proper gears and shift said gears into the proper positions. The lever is provided at its upper end with the usual ball or hand grip 54 and the sleeve 53 carries side fingers 55 in order that the sleeve may be firmly grasped and drawn upwardly along the lever in opposition to action of the spring 56 which is coiled about the lever with its lower end resting upon the sleeve and its upper end bearing against the base of the ball. A bolt or screw 57 carried by the lever and extending through a slot 58 formed longitudinally in the sleeve limits movement of the sleeve longitudinally upon the lever and prevents the sleeve from turning about the lever. Therefore, the sleeve will be prevented from moving out of a position in which the cross head 52 projects from opposite sides of the lever and the lugs 50 and 51 will be maintained in proper position to enter the sockets 48 and 49 of the selector heads. Normally, the lever will be disposed in the position shown with the lug 51 engaged in the socket 49 of the selector head 41' for operation of the main transmission but when it is desired to operate the auxiliary transmission, the fingers 55 are grasped and the sleeve drawn upwardly so as to move the lug 51 out of the socket 49 and the lever then rocked toward the left in Figure 2 so that when the sleeve is released and moved downwardly by the spring 56, the lug 50 will be engaged in the socket 48 and the lever operatively connected with the selector head 40'. The auxiliary transmission can then be actuated instead of the main transmission. When it is again desired to operate the main transmission instead of the auxiliary transmission, it is merely necessary to shift the sleeve upwardly and swing the lever to the position in which the lug 51 will engage in the socket 49 when the lever is released and moved downwardly by the spring. It will thus be seen that both transmissions may be actuated through the medium of a single lever which is adjustably mounted for movement into position for engagement with the head of a selector associated with the transmission which it is desired to operate.

Having thus described the invention, what is claimed as new is:

1. In an apparatus of the character described, a main transmission, an auxiliary transmission receiving motion from the main transmission, a twin head having companion members spaced from each other, selectors connected with the main transmission and the auxiliary transmission, respectively, and each mounted in a companion one of the spaced members of the twin head, a bearing member carried by the spaced members and disposed between the same, a shift lever connected at its lower end with said bearing member and mounted for universal movement over the twin head between the spaced members thereof, a sleeve slidably mounted on said lever, a cross head carried by said sleeve and projecting from opposite sides thereof yieldable means for holding the sleeve and cross head lowered, and pendent lugs at ends of the cross head to engage the main transmission selector or the auxiliary transmission selector, respectively, for operating the same when the lever is rocked transversely.

2. In an apparatus of the character described, a main transmission, an auxiliary transmission, a twin head having portions spaced transversely from each other, selectors connected with the main transmission and the auxiliary transmission, respectively, and extending through the spaced portions of said head with their upper ends projecting therefrom and provided with sockets, an arm extending from said head opposite space between spaced portions of the same, a shift lever having its lower end connected with the upper end of said arm for universal movement, a sleeve about said lever mounted for limited sliding movement thereon, a spring yieldably resisting upward sliding movement of the sleeve, a cross head at the lower end of said sleeve projecting from opposite sides of the sleeve and extending from the lever over upper ends of the selectors, and lugs depending from end portions of the cross head over the selectors whereby the lever may be rocked transversely to move a selected one of said lugs into the socket of a cooperating selector and the selector of the main transmission or the auxiliary transmission actuated.

BERTHA McCAFFERTY TRUITT.